United States Patent
Tate et al.

(10) Patent No.: US 6,353,636 B1
(45) Date of Patent: Mar. 5, 2002

(54) SYMBOL ALIGNMENT METHOD

(75) Inventors: Christopher Neville Tate, Bishop's Stortford; Andrew David Wallace, Harlow; Leslie Derek Humphrey, Old Harlow, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/219,005

(22) Filed: Dec. 23, 1998

(51) Int. Cl.$^7$ .............................. H04K 1/10; H04L 27/28
(52) U.S. Cl. ........................................ 375/260; 375/355
(58) Field of Search ................................. 375/260, 229, 375/331, 354, 355, 230; 370/503

(56) References Cited

U.S. PATENT DOCUMENTS

| | | | | |
|---|---|---|---|---|
| 5,187,711 A | * | 2/1993 | Hodohara | |
| 5,357,502 A | * | 10/1994 | Castelain et al. | |
| 5,995,568 A | * | 11/1999 | Molnar et al. | |
| 6,074,086 A | * | 6/2000 | Yonge, III | |
| 6,097,763 A | * | 8/2000 | Djokovic et al. | |
| 6,134,283 A | * | 10/2000 | Sands et al. | |

FOREIGN PATENT DOCUMENTS

GB          2304504 A          3/1997

* cited by examiner

*Primary Examiner*—Chi Pham
*Assistant Examiner*—Phuong Phu
(74) *Attorney, Agent, or Firm*—Lee, Mann, Smith, McWilliams, Sweeney and Ohlson

(57) ABSTRACT

A method, and related apparatus, for determining symbol alignment in a discrete multi-tone communications system comprising the steps of: receiving a signal on each of at least one selected carrier frequency; for each of a plurality of receiver window alignments with respect to said signals, deriving a measure of received signal power level on each said selected carrier frequency; for each said receiver window alignment and selected carrier frequency deriving a measure of spectral leakage on at least one adjacent carrier frequency; selecting a receiver window alignment responsive to said derived measures.

23 Claims, 7 Drawing Sheets

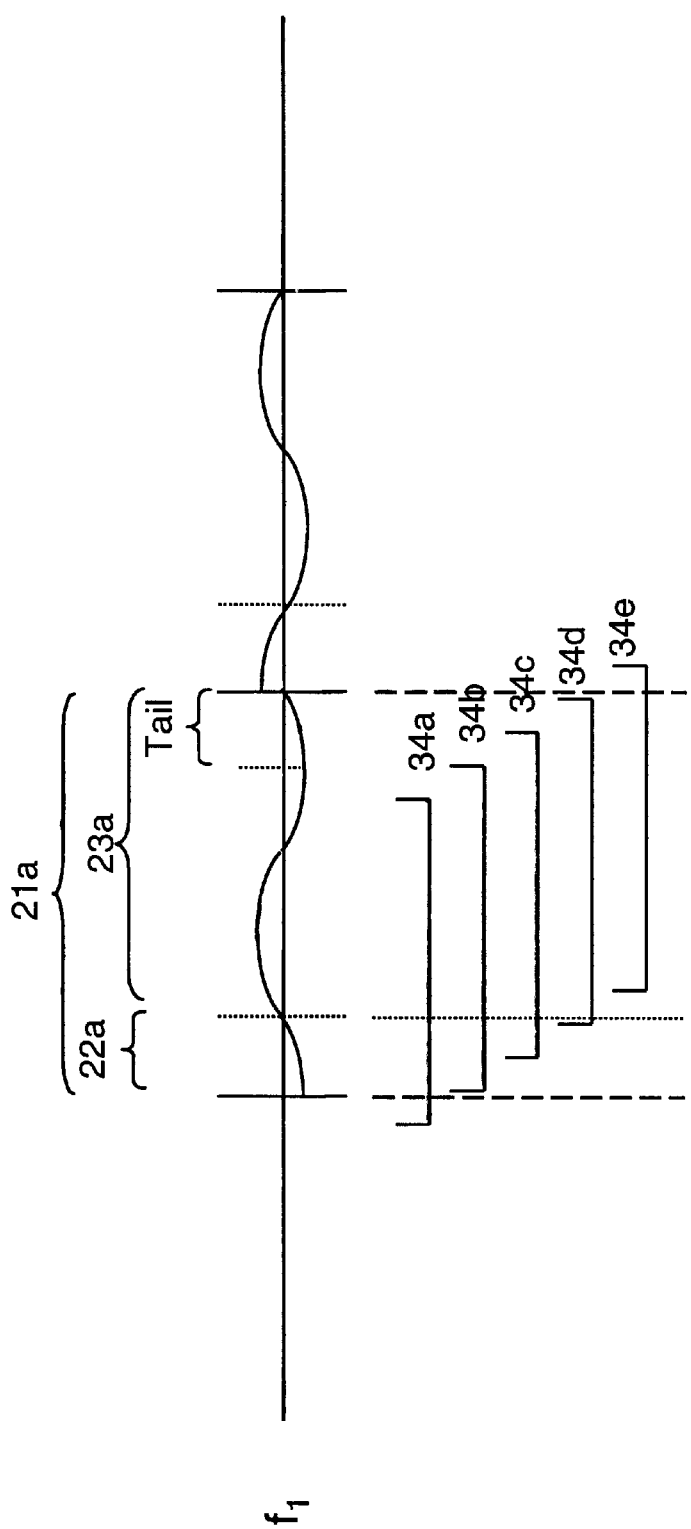

SYMBOL ALIGNMENT METHOD

FIELD OF THE INVENTION

The present invention relates to a method and apparatus for determining symbol alignment in Discrete Multi-Tone (DMT) or similar communications systems and a system incorporating the same.

BACKGROUND TO THE INVENTION

Telecommunication systems that interconnect wireline subscriber terminals are being developed to support broadband data communication. More particularly, recent developments in broadband communications protocols allow broadband data to be overlaid on narrowband voice or integrated service digital network (ISDN) traffic. Specifically, the interconnection of broadband modems located at the subscriber terminal and at an exchange allow current broadband access systems to communicate on spare spectrum (i.e. spare frequency channels) of a twisted pair communication resource; the spare frequency channels being isolated from conventionally encoded voice signals by a suitable filter. In this respect, and depending upon the complexity of the xDSL coding scheme, overlaid broadband systems can support data rates in excess of two Megabits per second (Mbps), although this rate is dependent upon the physical parameters of the connection, e.g. the overall length of the twisted pair and its composition and configuration.

Asymmetric Digital Subscriber Line (ADSL) and High-Speed digital Subscriber Line (HDSL) protocols, for example, can support data rates of 2 Mbps over distances of approximately three kilometres, while more complex schemes (such as VDSL) can support data rates of 8 Mbps and above over distances of, typically, less than two kilometres. Protocols such as Very high-speed Digital Subscriber Line (VDSL) utilise multiple sub-channel carriers, e.g. in a discrete multi-tone (DMT) environment, to provide a system that mitigates the effects of cross-talk by selectively ignoring noise-affected sub-channel carriers or reducing the number of bits supported on each sub-channel. DMT provides a comb of frequency carriers that are each separately modulated and then combined to generate a composite signal envelope. As such, information (both control information and traffic) is distributed across a number of different frequency carriers.

DMT schemes for supporting VDSL are often realised in a time division duplex (TDD) transmission environment in which a single communication resource (i.e. a frequency band) supports both up-link and down-link transmissions using the same frequencies. In other words, there is a sharing in time of the bandwidth provided by the extended spectrum. The use of guard periods between adjacent groups of time-slots within a TDD frame ensures that rogue overlapping transmissions within the up-link and down-link do not occur, and hence eliminates the likelihood of near-end cross talk (NEXT).

In order to establish effective end-to-end communication in a communication system, it is necessary for synchronisation between a transmitting unit and an interconnected receiving unit to occur. This is true for both a radio frequency environment and a wireline environment, such as a VDSL system employed over a twisted pair. More specifically, synchronisation is required to demodulate encoded signals that are addressed to the receiver. In this respect and in relation to a DMT system (or the like, such as an orthogonal frequency division multiplexed OFDM scheme), a pilot carrier or tone is used in a training sequence on a dedicated (pre-allocated) sub-channel. Initially, upon receipt of the pilot tone, the receiver acquires frequency lock and then establishes phase lock.

OBJECT TO THE INVENTION

The invention seeks to provide an improved method and apparatus for determining symbol alignment in discrete multi-tone communications systems and a system incorporating the same.

SUMMARY OF THE INVENTION

According to a first aspect of the present invention there is provided a method of determining symbol alignment in a discrete multi-tone communications system comprising the steps of: receiving a signal on each of at least one selected carrier frequency; for each of a plurality of receiver window alignments with respect to said signals, deriving a measure of received signal power level on each said selected carrier frequency; for each said receiver window alignment and selected carrier frequency deriving a measure of spectral leakage on at least one adjacent carrier frequency; selecting a receiver window alignment responsive to said derived measures.

Advantageously this enables faster and more accurate selection of a receiver window alignment for symbol extraction than making the selection based on the power levels of the selected carrier frequency alone.

Advantageously the use of a power measurement on said selected carriers and said adjacent carriers provides a more selective metric for the symbol alignment process than is obtained from a power measurement on said selected carrier frequency alone.

Preferably, said at least one adjacent carrier frequency is a silent carrier frequency.

Preferably, silent carrier power levels are at least in the order of 30 dB lower than active carrier power levels.

Preferably, said selection of receiver window alignment is responsive to the difference between the received signal power level on said selected carrier frequency and a multiple of said received signal power level on said adjacent carrier frequencies Preferably, said multiple is in the order of 50.

Preferably, each said measure of received signal power levels is a time average of a plurality of measures of received signal power levels.

Advantageously, this provides a more representative carrier power measurement and hence improves the reliability of the received symbol alignment.

In a first preferred embodiment, said selected receiver window alignment is one of said set of receiver window alignments.

In a second preferred embodiment, said selected receiver alignment window is interpolated between alignments in said set of receiver window alignments.

Advantageously this permits use of a smaller number of receiver window alignments during sampling whilst still obtaining a well-positioned receiver window alignment.

Preferably, said carrier frequencies are in a frequency band 0–10 MHz.

Advantageously this permits the method to be used over existing twisted copper pair to the home.

Preferably, successive selected carrier frequencies are separated by a plurality of silent carrier frequencies.

This reduces the likelihood of a given silent carrier frequency being affected by more than one active carrier.

Preferably, selected carrier frequencies are distributed across a frequency band utilised by said discrete multi-tone communications system.

Advantageously, this assists both in selecting a compromise symbol alignment suitable for all discrete frequencies in the frequency band, and in reducing the susceptibility to locally poor signal to noise ratio in any individual frequency.

Preferably, the step of selecting a receiver window alignment responsive to said derived measures comprises the steps of: identifying which receiver window alignment gives rise to the largest difference; searching backwards and forwards to identify receiver window alignments at which said differences drop below a given fraction of said largest difference; selecting an optimal receiver window alignment between said receiver window alignments at which said differences drop below a given fraction of said largest difference.

Advantageously this compensates for cases where the largest difference may be unduly influenced by received noise which would give rise to a suboptimal choice of alignment.

Preferably, said receiver window alignment between said receiver window alignments is chosen to be approximately mid-way between said receiver window alignments at which said differences drop below a given fraction of said largest difference.

Preferably, said fraction is approximately nine tenths.

Preferably, said signal forms part of a TDD communications channel comprising a succession of frames, each frame comprising a receive region and each comprising a succession of DMT symbols.

Preferably, said step of deriving measures of received signal power level on each of said selected carrier frequencies is performed on a single symbol in each said receive region.

In one preferred embodiment, the step of selecting a receiver window alignment responsive to said derived measures comprises the steps of: selecting a narrower range of receiver window alignments responsive to said derived measures; selecting, within said narrower range, a second range of receiver window alignments with respect to said signals; for each said receiver window alignment in said second range deriving a further measure of received signal power level on each said selected carrier frequency; for each said receiver window alignment in said second range and selected carrier frequency deriving a further measure of spectral leakage on at least one adjacent carrier frequency; selecting a receiver window alignment responsive to said further derived measures.

Advantageously the approach of performing a coarse grained alignment followed by a finer grained alignment may be used to speed up the alignment process.

According to a second aspect of the present invention there is provided a signal receiver arranged to receive discrete multi-tone signals and comprising: a signal input arranged to receive a signal on each of at least one selected carrier frequency; a processor arranged to select a plurality of receiver window alignments with respect to said signals, for each said receiver window alignment to derive a measure of received signal power level on each said selected carrier frequency, for each said receiver window alignment and selected carrier frequency to derive a measure of spectral leakage on at least one adjacent carrier frequency and to select a receiver window alignment responsive to said derived measures.

The invention also relates to a discrete multi-tone system comprising: a receiver according to the second aspect of the present invention; a transmitter having a signal output and arranged to provide said signals and to remain silent on said adjacent carrier frequencies; and a transmission medium arranged to convey discrete multi-tone signals from said output port to said input port.

The invention also relates to a TDD communications system comprising a signal receiver according to the second aspect of the present invention.

The invention also relates to a VDSL discrete multi-tone modem comprising a signal receiver according to the second aspect of the present invention.

The invention also relates to a telecommunications network comprising a signal receiver according to the second aspect of the present invention.

According to a further aspect of the present invention there is provided a program for a computer on a machine readable medium arranged to perform the steps of: receiving a signal on each of at least one carrier frequency; applying each of a plurality of receiver window alignments to said signals; deriving a measure of each said receiver window alignment as applied to each said signal; for each said receiver window alignment deriving a measure of spectral leakage on a carrier frequency adjacent at least one of said at least one carrier frequencies; selecting a receiver window alignment responsive to said derived measures.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 3 shows how receiver window alignment relates to a received symbol portion;

DETAILED DESCRIPTION OF INVENTION

Figure 1:
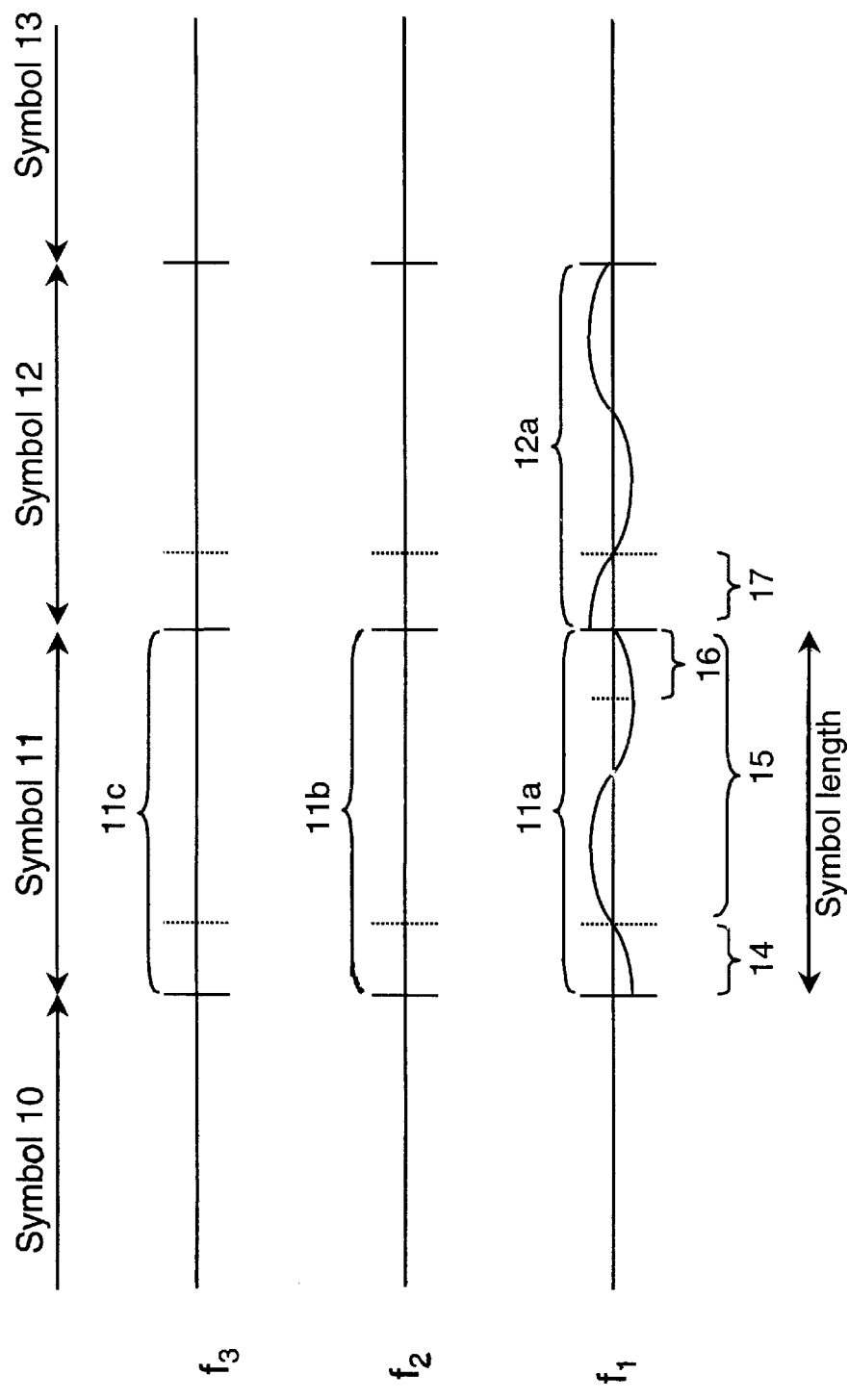
FIG. 1 shows a DMT symbol encoding as transmitted.

In a digital multi-tone communications (DMT) system, successive blocks of user data are encoded into a sequence of DMT symbols. An example of such a sequence of DMT symbols 10–12 is shown in FIG. 1.

Each such symbol, for example symbol 11, is encoded as a set of symbol portions 11a–c which are transmitted in parallel utilising a plurality of carrier frequencies. In the example shown three frequencies, $f_1$–$f_3$, are employed, but in practice more or fewer may be employed. Each symbol portion is transmitted on a distinct frequency.

Owing to differing propagation characteristics of different carrier frequencies through the transmission medium, the boundaries between successive portions of successive symbols 10–12 on each of the carrier frequencies do not typically arrive simultaneously at a receiver, even though they are typically transmitted simultaneously. It is therefore necessary to perform a symbol alignment process for each underlying carrier frequency separately in order to establish where the corresponding symbol boundaries occur in each received carrier frequency signal. Determining the symbol alignments enables subsequent demodulation and recombination of corresponding symbol portions to recover the original transmitted symbol.

Symbol alignment is performed during an initial training phase during which the DMT transmitter and receiver co-operate in a predetermined fashion to provide essential information regarding the communication channel and modem function. During this training phase, one or more training signals are transmitted to the receiver.

The present invention employs a set of transmitted "active" carrier frequencies which are not continuous across symbol boundaries in the time domain. Symbol portions on such an active carrier comprise a prefix portion 14a–c and a body portion 15a–c. Each prefix portion 14a–c is a duplicate of a tail portion 16a–c of body portion 15a–c respectively, and is arranged such that each prefix portion joins to its associated body portion 15 without any discontinuity in the signal at that point. Each active carrier frequency is chosen such that the symbol length is not an integral multiple of periods of the chosen frequency, consequently a discontinuity does occur between a given body portion 15a–c of a symbol 11 and the prefix portion 17a–c of the corresponding symbol portion of the following symbol transmitted on the same frequency.

In one preferred embodiment, the symbol body portion comprises an encoding of several hundreds of octets of data, and the head portion comprises around 12.5% of the symbol body length.

Figure 2:
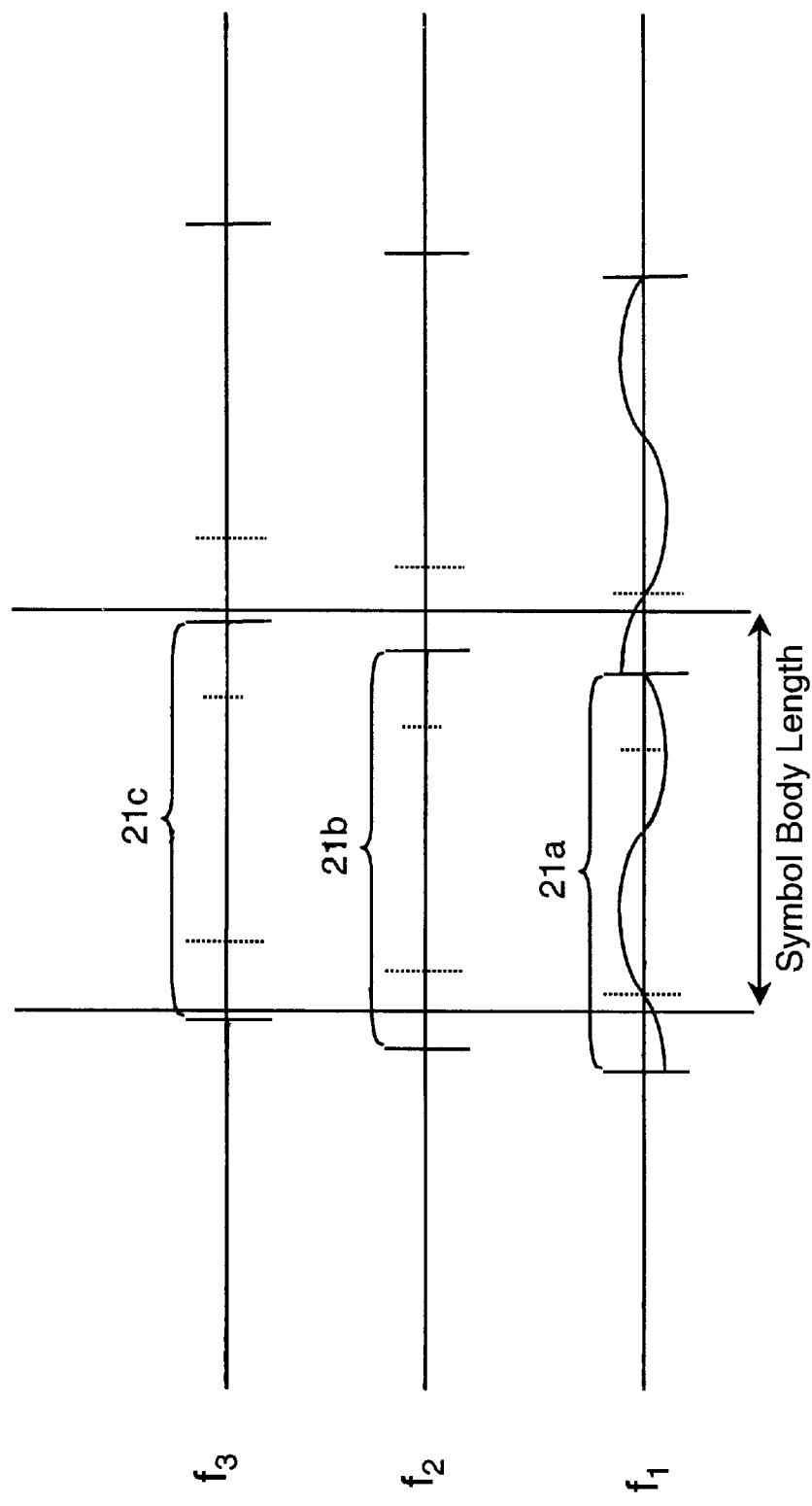
FIG. 2 shows a DMT symbol encoding as received.

FIG. 2 illustrates how the series of symbols 10–12 of FIG. 1, each transmitted using a number of frequencies, $f_1$, $f_2$, $f_3$, might be received at a DMT receiver. The figure shows how portions 11a–c of symbol 11 have been delayed by differing amounts during transmission, resulting in their arrival at the receiver at different moments as portions 21a–c respectively.

Specific symbol alignment at a receiver may be achieved by successively applying each of a set of sampling windows to a received signal, deriving a measure from each such sample, and choosing a suitable window from the set according to chosen criteria applied to those measures.

In a simplified example illustrated in FIG. 3, five such sampling windows, 34a–34e are shown. In practice more windows could be used for finer alignment. Of the windows shown, 34a and 34e fall partially outside the boundaries of the central symbol portion 41a whilst each of 34b–34d represent samples fully within the symbol.

In the example shown the sampling window is one symbol body portion in length and offset in time with respect to each other. However alternative sampling windows such as the extended window described in GB 2,304,504 A may also be used.

By selecting a suitably long prefix portion 14 for each frequency, chosen to equal or exceed the maximum relative propagation delay expected between symbol portions on different carrier frequencies and the relative delays between successive sampling windows, it is possible to ensure that there exists at least one receiver window alignment which simultaneously coincides entirely with each of the symbol portions on different carriers corresponding to a single transmitted symbol. By identifying and selecting such a receiver window alignment, a single alignment window can be used to extract simultaneously all related symbol portions on each given transmitted symbol.

Whilst FIG. 3 shows the five sampling windows all aligned relative to the same symbol, in practice each such sampling window would be used to sample a number of successive symbols before switching to the next sampling window.

In addition the method may be refined by using coarse window steps initially to obtain an approximate alignment and then applying finer window steps around that alignment to gain fine adjustment.

In cases where the symbol length is a multiple of a given carrier period this would give rise to the situation where symbols are continuous across the symbol boundaries. Such combinations of symbol length and frequency are therefore not suitable for use in this method. However they may be used for frequency locking.

In an alternative embodiment, different receiver window alignments may be chosen for different carriers.

Figure 4A:
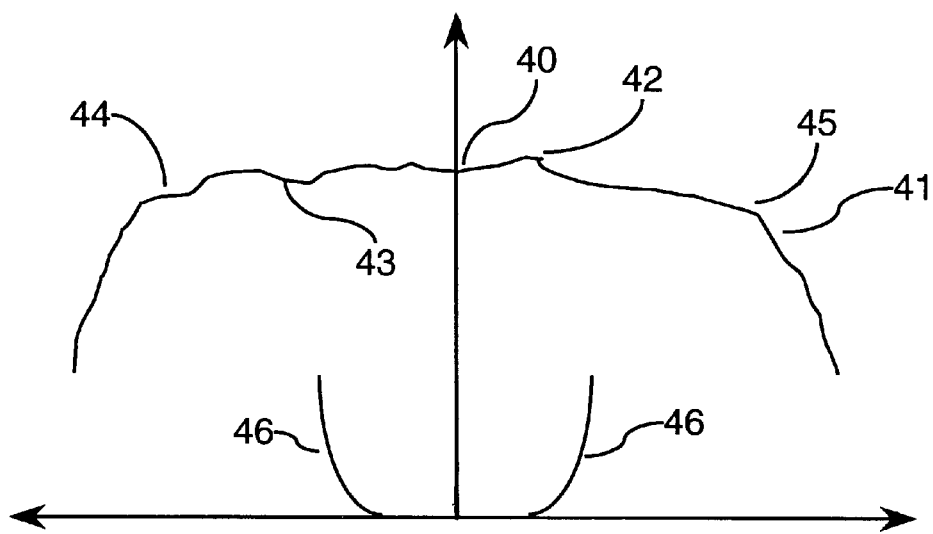
FIG. 4(a) shows portions of an active carrier power curve and an adjacent silent carrier as received at a receiver.
Figure 4B:
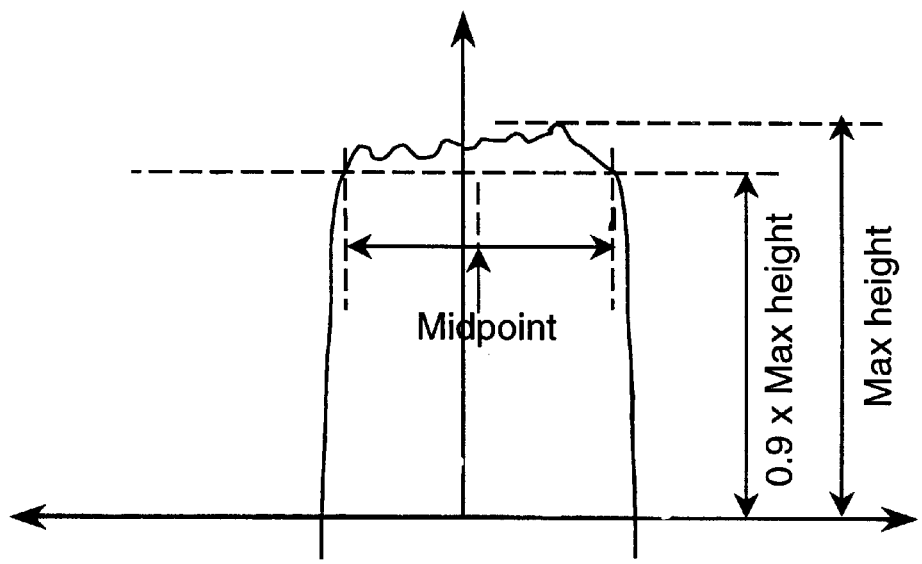
FIG. 4(b) shows the corresponding graph of a receiver window alignment metric.

Referring now to FIG. 4, there is shown a plot 41 of the sampling window metric against window position, with respect to the mid-point of a symbol. The graph illustrates how, as the window moves away from the central position 40, the metric changes only gradually over a relatively wide range, before dropping off as the sampling window overlaps adjacent symbols and hence is affected by the signal discontinuity across the symbol boundaries.

If random fluctuations 42, 43 in the metric arising owing to noise on the received signal are to be compensated for, then misalignment will only be detectable once the window has moved well out of optimum alignment, for example at points 44, 45.

The present method makes use of other adjacent silent carriers which are explicitly turned off (i.e. have zero transmit power level).

FIG. 4 also shows a plot 46 of a corresponding power metric of such an adjacent silent carrier frequency as the window moves across the same symbol. In this case power on the adjacent silent carrier drops to zero (subject to any noise on that channel) when the sampling window lies fully within the symbol. However, as the sampling window moves out of the symbol, the power level on the adjacent channel rises steeply: importantly it changes more rapidly at this point than does the corresponding power level 41 on the active carrier.

Good symbol alignment is achieved when maximum power is received on the active carrier and minimum power is received on adjacent silent carriers: that is, when spectral leakage is minimised.

By basing a choice of receiver window alignment on detecting changes in power on the adjacent carriers due to spectral leakage rather than on the active carrier alone, it is possible to identify a receiver window alignment closer to the optimum central position.

In a preferred embodiment, a metric used is the difference between the power output on the active channel and a multiple of the power on one or more adjacent silent carriers. In a most preferred embodiment, the difference between the power on an active carrier and approximately fifty times the power on an adjacent silent carrier is used.

Figure 5:
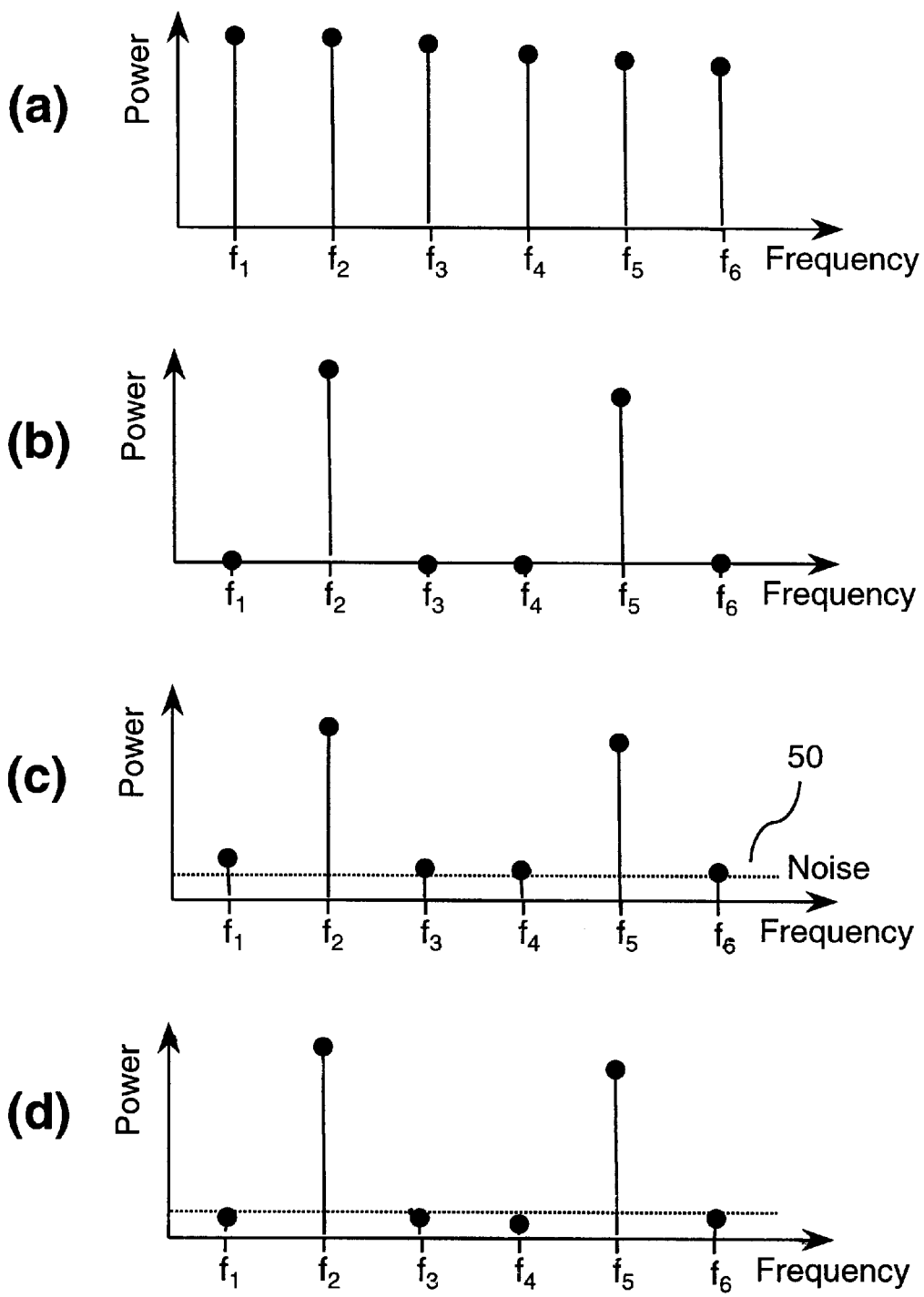
FIGS. 5(a–d) show graphs of typical power amplitudes on adjacent channels in a DMT system.

Referring now to FIGS. 5(*a–d*), there are shown graphical representations of power levels on a set of carrier frequencies at various stages of DMT system operation.

FIG. 5(a) shows an example of carrier power as transmitted during normal operation of the system after symbol alignment: a similar power level is applied to each carrier $f_1$–$f_6$.

FIG. 5(b) shows an example of the corresponding power levels as they might be applied during symbol alignment according to the present invention. Frequencies $f_2$ and $f_5$ are operated at normal power, whilst adjacent carriers $f_0$, $f_3$ and $f_4$, $f_6$ respectively are silent (i.e. their power output is set to zero).

Whilst in a most preferred embodiment silent channel power levels are set to zero, it is sufficient that they be set to a power level sufficiently low as to permit detection of spectral leakage from adjacent carriers at the receiver. For this purpose, the silent carrier power level should be in the order of 30 dB lower than that in adjacent active carriers.

FIG. 5(c) shows example carrier frequency power levels at a receiver corresponding to the transmission levels of FIG. 5(b) while the sampling receiver window alignment is suboptimal. Whilst the active frequency carrier received signal strength remains higher than that on the adjacent silent carriers, there is some spectral leakage from the active carriers to those adjacent silent carriers. Where the resulting power increase on the silent carriers exceeds the expected background noise level 50 received on the silent carriers, this gives an indication of window misalignment.

FIG. 5(d) shows example carrier frequency power levels at a receiver corresponding to the transmission levels of FIG. 5(b) while the sampling receiver window alignment is optimal. The active frequency carrier received signal strength is high relative to that on the adjacent silent carriers, and spectral leakage, if any, to adjacent silent carriers is indistinguishable from the expected background noise on those carriers. Such an arrangement is indicative of good sampling receiver window alignment.

It is possible that an optimal alignment can be identified before all receiver window alignments have been applied, for example when a clear high metric has already been derived between two significantly lower metrics. Under such circumstances it is possible to omit applying remaining receiver window alignments so as to reduce unnecessary symbol alignment processing.

Whilst in the examples shown two silent carriers are shown between the active carriers, this may be reduced to a single silent carrier between two active carriers or, in a preferred embodiment, increased so that successive active carriers are separated by several silent carriers.

In a typical system a frequency band of 0–10 MHz may be partitioned to support 512 carriers. It is not essential that all carriers be utilised for DMT traffic: for example in a preferred scenario, some carrier channels may be reserved for carrying Integrated Services Digital Network (ISDN) or Plain Old Telephone Service (POTS) traffic in parallel with DMT traffic on some or all of the remaining carriers.

Preferably, a plurality of carriers is tuned simultaneously, though the method may be applied to single active carriers. Where a plurality of carriers is tuned simultaneously, then it is preferable to select carriers distributed across the frequency range so as both to determine a suitable compromise symbol alignment and to reduce the susceptibility to locally poor spectral Signal to Noise Ratio (SNR).

During the alignment process the transmitter continually sends the alignment carriers (which may also be modulated to eliminate constant intermodulation products). At the receiver, the power level on a chosen active alignment carrier is measured, and at the same time the power level is measured on an adjacent silent carrier. Averaging over a period of time (a given number of symbols) can be used to improve the reliability of this measurement. The receiver window alignment is then shifted and the measurements repeated. This is performed until the complete range over which alignment is expected has been covered. An alignment metric is then calculated by subtracting a factor, k>0 (for example k=50), times the power received on the silent carriers from the power received on the adjacent active carriers. The metric can then be used to select the alignment to be used for data transmission (the higher the metric the better the alignment).

Since the metric may not change significantly over a range of alignment offsets the method can be extended to find the central point over this range. This can be done by searching the range for the largest metric, then searching both backwards and forwards from that point to find points at which the first metric first falls below a given fraction (for example 0.9) of the maximum. An alignment chosen midway between these two points is then used for data transmission. This method of choice serves to avoid the situation where a local maximum of the metric, arising perhaps from a peak in background noise, would otherwise give rise to a sub-optimal choice of receiver window alignment.

This technique is appropriate, inter alia, for use in VDSL DMT modems.

Figure 6:
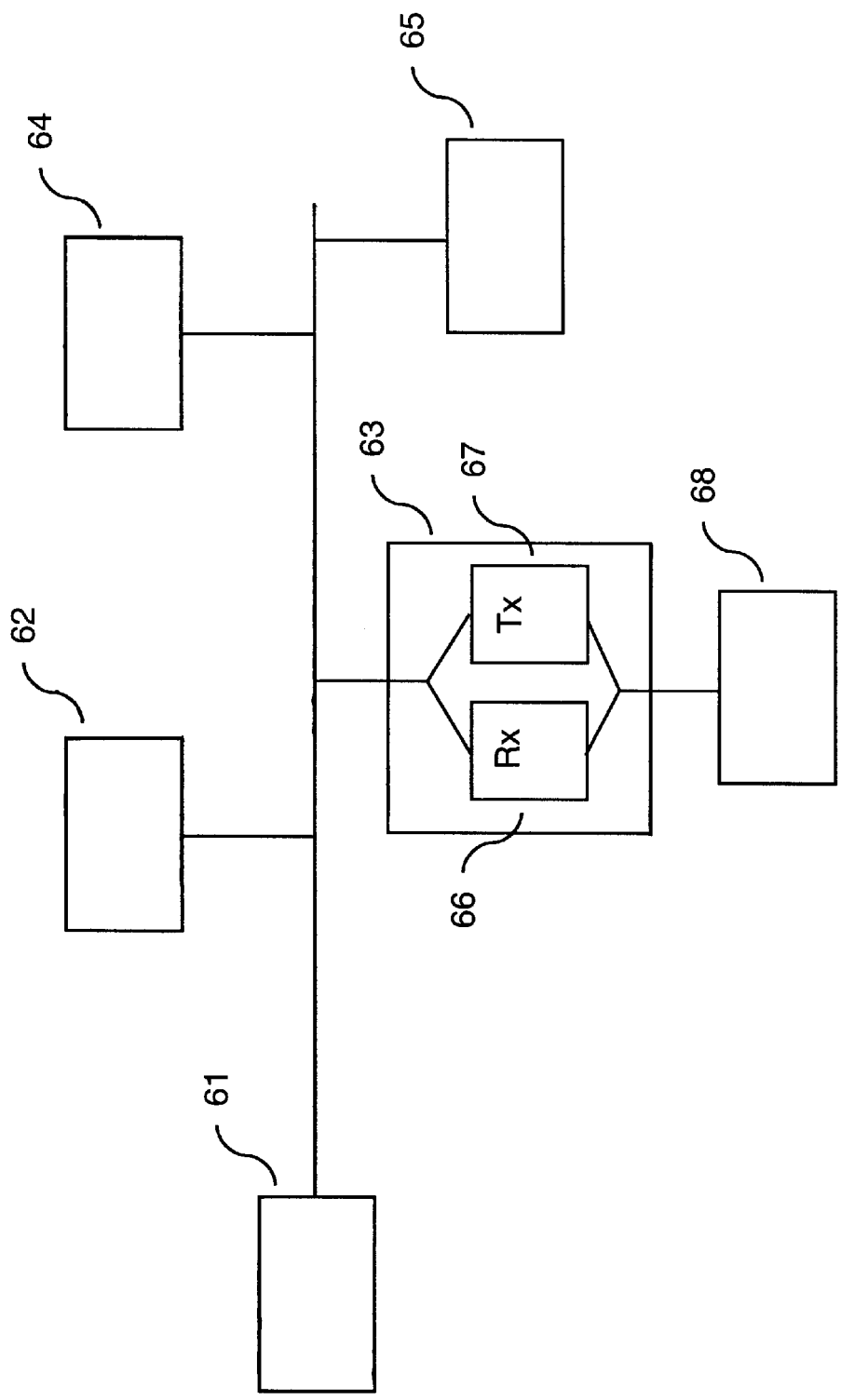
FIG. 6 shows a block diagram of a Time Division Duplex system compatible with the present invention.

FIG. 6 shows an example of a time division duplex (TDD) network capable of utilising the present invention. The network comprises a transmission medium 60, a head-end modem 61, and subscriber modem 62–64. Each modem comprises a receiver 66 and transmitter 67 coupled both to the medium and to a local subscriber terminal 68, the receiver comprising at least an input port and a processor.

Figure 7:
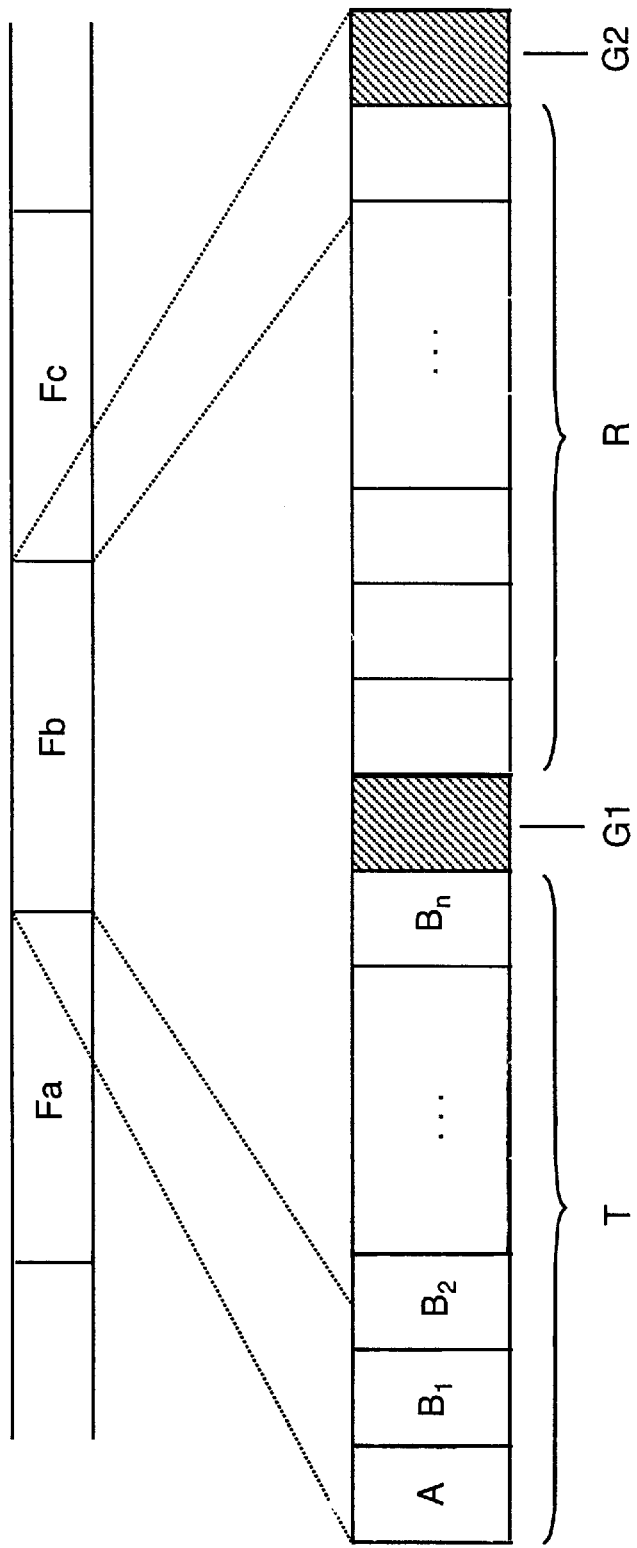
FIG. 7 shows the structure of frames in the TDD system of FIG. 6.

Communication is effected by means of a TDD protocol, each signal comprising successive frames Fa–Fc as shown in FIG. 7. Each frame comprises a transmit region T, a first guard region G1, a receive region R, and a second guard region G2. During symbol alignment according to the present invention, the transmit region of each frame comprises a series of symbols each of one of two types: type A and type B.

Within each transmit region, in a preferred embodiment, only one symbol is of type A whilst all others are of type B. In the example shown the first symbol of each frame is of type A whilst subsequent symbols $B_1$–$B_n$ are each of type B. Type A symbols contain the active and silent carriers for symbol alignment and frequency lock (clock recovery) whilst type B symbols contain only clock recovery active carriers. By setting the first symbol in each transmit frame to be of type A this allows both symbol alignment and TDD frame alignment to be performed simultaneously without the need for separate information to be provided to enable TDD frame alignment.

As perceived by a receiver, and because of the translational symmetry of the frames, the transmit regions as transmitted are treated as the receive regions at the receiver. In this way the receiver reads the Type A symbol inserted by the transmitter as the first symbol in the receive field.

Any range or device value given herein may be extended or altered without losing the effect sought, as will be apparent to the skilled person for an understanding of the teachings herein.

What is claimed is:

1. A method of determining symbol alignment in a discrete multi-tone communications system comprising the steps of:

receiving a signal on each of at least one selected carrier frequency;

for each of a plurality of receiver window alignments with respect to said signals, deriving a measure of received signal power level on each said selected carrier frequency;

for each said receiver window alignment and selected carrier frequency deriving a measure of spectral leakage on at least one adjacent carrier frequency;

selecting a receiver window alignment responsive to said derived measures.

2. A method according to claim 1 wherein said at least one adjacent carrier frequency is a silent carrier frequency.

3. A method according to claim 1 wherein silent carrier power levels are at least in the order of 30 dB lower than active carrier power levels.

4. A method according to claim 1 wherein said selection of receiver window alignment is responsive to the difference between the received signal power level on said selected carrier frequency and a multiple of said received signal power level on said adjacent carrier frequencies.

5. A method according to claim 4 wherein said multiple is in the order of 50.

6. A method according to claim 1 wherein each said measure of received signal power levels is a time average of a plurality of measures of received signal power levels.

7. A method according to claim 1 wherein said selected receiver window alignment is one of said set of receiver window alignments.

8. A method according to claim 1 wherein said selected receiver alignment window is interpolated between alignments in said set of receiver window alignments.

9. A method according to claim 1 wherein said carrier frequencies are in a frequency band 0–10 MHz.

10. A method according to claim 1 wherein successive selected carrier frequencies are separated by a plurality of silent carrier frequencies.

11. A method according to claim 1 wherein selected carrier frequencies are distributed across a frequency band utilised by said discrete multi-tone communications system.

12. A method according to claim 2 wherein the step of selecting a receiver window alignment responsive to said derived measures comprises the steps of:

identifying which receiver window alignment gives rise to the largest difference;

searching backwards and forwards to identify receiver window alignments at which said differences drop below a given fraction of said largest difference;

selecting an optimal receiver window alignment between said receiver window alignments at which said differences drop below a given fraction of said largest difference.

13. A method according to claim 12 wherein said receiver window alignment between said receiver window alignments is chosen to be approximately mid-way between said receiver window alignments at which said differences drop below a given fraction of said largest difference.

14. A method according to claim 12 wherein said fraction is approximately nine tenths.

15. A method according to claim 1 wherein said signal forms part of a TDD communications channel comprising a succession of frames, each frame comprising a receive region and each comprising a succession of DMT symbols.

16. A method according to claim 15 wherein said step of deriving measures of received signal power level on each of said selected carrier frequencies is performed on a single symbol in each said receive region.

17. A method of according to claim 1 wherein the step of comprising the steps of selecting a receiver window alignment responsive to said derived measures comprises the steps of:

selecting a narrower range of receiver window alignments responsive to said derived measures;

selecting, within said narrower range, a second range of receiver window alignments with respect to said signals;

for each said receiver window alignment in said second range deriving a further measure of received signal power level on each said selected carrier frequency;

for each said receiver window alignment in said second range and selected carrier frequency deriving a further measure of spectral leakage on at least one adjacent carrier frequency;

selecting a receiver window alignment responsive to said further derived measures.

18. A signal receiver arranged to receive discrete multi-tone signals and comprising:

a signal input arranged to receive a signal on each of at least one selected carrier frequency;

a processor arranged to select a plurality of receiver window alignments with respect to said signals, for each said receiver window alignment to derive a measure of received signal power level on each said selected carrier frequency, for each said receiver window alignment and selected carrier frequency to derive a measure of spectral leakage on at least one adjacent carrier frequency and to select a receiver window alignment responsive to said derived measures.

19. A discrete multi-tone system comprising:

a receiver according to claim 18;

a transmitter having a signal output and arranged to provide said signals and to remain silent on said adjacent carrier frequencies; and a transmission medium arranged to convey discrete multi-tone signals from said output port to said input port.

20. A TDD communications system comprising a signal receiver according to claim 18.

21. A VDSL discrete multi-tone modem comprising a signal receiver according to claim 18.

22. A telecommunications network comprising a signal receiver according to claim 16.

23. A program for a computer on a machine readable medium arranged to perform the steps of:

receiving a signal on each of at least one carrier frequency;

applying each of a plurality of receiver window alignments to said signals;

deriving a measure of each said receiver window alignment as applied to each said signal;

for each said receiver window alignment deriving a measure of spectral leakage on a carrier frequency adjacent at least one of said at least one carrier frequencies;

selecting a receiver window alignment responsive to said derived measures.

* * * * *